Patented Aug. 31, 1937

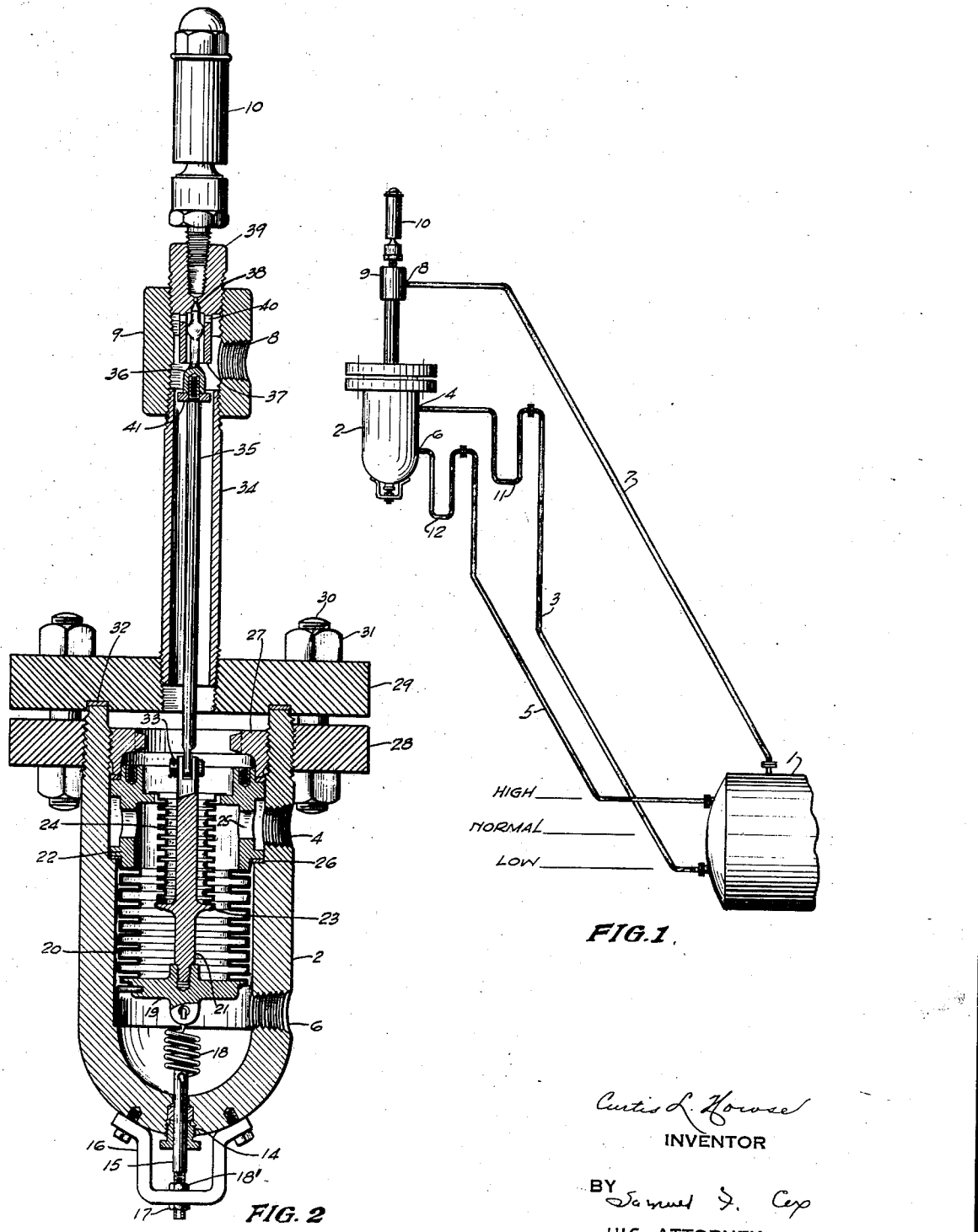

2,091,318

UNITED STATES PATENT OFFICE 2,091,318

LIQUID LEVEL INDICATOR

Curtis L. Howse, Detroit, Mich., assignor to Diamond Power Specialty Corporation, Detroit, Mich., a corporation of Michigan Application May 20, 1933, Serial No. 672,020

8 Claims. (Cl. 116—109)

The invention is directed to an improvement in liquid level indicators, particularly of the type in which an alarm is sounded to indicate changes in water level in a container, such, for example, as a boiler drum. In devices of this sort, it is usual to provide means for sounding the alarm when a predetermined high level of the liquid in the container is reached and, similarly, for sounding the alarm when a predetermined low level of the liquid in the container is reached. Between these limits the alarm is not sounded.

In high and low alarm apparatus, as previously constructed, operation of the alarm is produced by reason of difference in displacement of either floats or weights with varying water level. The present invention dispenses entirely with any displacement weights or floats of any type. Furthermore, in such systems as heretofore constructed employing the float or weight displacement principle, it has ordinarily been necessary, particularly at the higher pressures to employ a system of levers to actuate the valve controlling the supply of steam or the like to the alarm whistle. The present system dispensing with floats or weights and employing what may be described as the pressure differential principle, makes available a considerably greater force for actuation of the valve for controlling the supply of steam or the like to the alarm whistle. It is, therefore, unnecessary, with the present system, to use levers of any type which may be in the employment of this invention entirely dispensed with.

Aside from the relatively small pressure differential required to actuate the device, the moving members of the system are subjected to substantially balanced pressures on all sides, permitting the employment of the invention at extremely high pressures. Other features and advantages of the invention will be noted as the description proceeds, reference being had to the accompanying drawing, wherein like parts are designated by like reference characters throughout all views, and wherein:

Figure 1 is a front elevation of a boiler drum showing the invention applied thereto; and Figure 2 is a vertical sectional elevation through the high and low alarm mechanism.

Referring to Figure 1, I designates the boiler drum to which the casing 2 containing the high and low alarm mechanism is suitably connected. This view also indicates the normal water level in the boiler drum and the high and low levels respectively. The mechanism is so arranged, as will be hereinafter described, that it actuates a suitable alarm upon attainment of either the high or low levels indicated, by the water in the boiler drum.

3 is a line threadably engaging casing 2 at 4 and opening into the boiler drum below the normal water level therein and at substantially the low level point. Similarly, 5 is a pipe line threadably engaging casing 2 at 6 and opening into the boiler drum above the normal water level therein and at approximately the desired high level indicating mark.

Lines 5 and 3 are provided with traps 12 and 11 respectively to insure that steam or hot water from the boiler drum will never enter the casing 2 of the high and low alarm mechanism, these traps filling with condensate or water which will remain cool and while transmitting the necessary pressures to the high and low alarm mechanism, will insure that hot water or steam will never contact the same.

7 is a line leading from the steam space of the boiler drum, threadably engaging coupling 9 at 8 and supplying steam for the actuation of whistle 10 in the manner to be hereinafter described.

Referring now to Figure 2, the casing 2 is provided with a packed opening 14 at its lower end through which projects rod 15. This rod exteriorly of the casing 2 is supported in bracket 16, fixed to the casing 2, the rod being threaded at its end and provided with adjusting nuts 17 and 18'. These may, obviously, be varied to fix the position of the rod longitudinally of the casing 2.

Fixed to the upper end of the rod 15 is spring 18 which is made, preferably, of a copper-beryllium alloy or of a composition suitable to withstand the mechanical forces to which it is subjected and the corrosive environment.

The upper end of spring 18 is suitably fixed to flange 19 which, in turn, threadably engages vertical rod 21. The lower end of bellows 20 is fixed as by brazing or welding to flange 19. The upper end of this bellows is fixed to the stationary cylindrical member 22. Between this member 22 and a shoulder, formed interiorly of the housing 2, is provided the gasketed joint 26.

A smaller flange 23 is formed integrally on the vertical rod 21 and to this flange is fixed the lower end of a second bellows member 24. The upper end of this bellows member 24 is fixed as by welding or brazing to an inwardly projecting flange on the cylindrical member 22.

This member 22 is provided with openings 25 communicating with threaded opening 4 in the housing 2, thus providing access to the space formed between the bellows 20 and 24.

To maintain the cylindrical member 22 in proper position, lock nut 27 is provided, a gasketed joint between this lock nut and the cylinder 22 being also provided as indicated.

Flange 28 threadably engages the upper portion of the housing 2. A co-operating flange 29 closes the open top of the housing 2, the recessed gasketed joint 32 being provided to secure tightness. Bolts 30 and nuts 31 join the flanges 28 and 29 to close the open top of the housing 2.

Fixed as at 33 to the upper end of the vertical rod 21 is the rod 35. This extends upwardly through an opening in flange 29 and substantially centrally of tube 34, threadably engaged in the said opening in the flange 29. Secured to the upper end of rod 35 is the valve member 36. Coupling 9, as shown, is threaded to the upper end of the tube 34, this coupling being provided with the threaded opening 8 for the access of steam to the interior of the coupling through line 7 as shown in Figure 1. Plug 39 is threaded in the upper end of coupling 9, this plug being provided with the valve seat 38, adapted to be engaged by the upper end of the valve member 36. This valve member 36 is adapted to move to and away from the seat 38 to control the supply of steam from the steam space of the boiler drum 1 through line 7 to the whistle 10. This whistle 10 is threadably engaged in the plug 39 and is of conventional design.

To guide the valve member 36 in its movement to and from seat 38, the tubular guide 37 may be provided, this being provided with openings 40 at its upper end to permit access of the steam to the valve controlled opening in plug 39.

The valve member 36 is provided with the flange 41 at its lower end to minimize the passage of steam down into the casing 2 containing the high and low alarm mechanism. The tube 34 is also made relatively long so that the steam valve to the whistle will be located a relatively considerable distance from the high and low alarm mechanism contained in housing 2. This is in order to minimize the contact of hot steam with the said mechanism, the flange member 41 serving to minimize convection currents through the relatively long tube 34.

Referring to Figure 2, the position of the various parts is that occupied when the water in the boiler drum is at the normal position or approximately thereabouts. In this state of affairs, the line 3 will ordinarily be full of water due to the fact that condensation of steam vapor arising from the hot water, or present previously in the line, causes a vacuum which permits pressure in the drum to force the water upwardly in line 3 to fill this line clear up to the inlet 4 of the housing 2. Line 5 being connected above the normal water level would be filled with steam only, any condensate formed running down the line into the boiler drum due to the inclined position of the line as shown.

The line 7 connecting to the steam space of the boiler drum will, of course, admit steam to coupling 9 and hence to the valve chamber, as has been before pointed out. This line 7 with the associated parts will be under steam pressure at all times while the boiler is in operation, this steam being necessary, of course, to operate the whistle or other alarm device.

Line 3, as has been pointed out, connects through opening 4 into the space between bellows 20 and 24; line 5 connects through opening 6 with the space underneath flange 19. So far as concerns the boiler pressure itself, this is imposed equally upon both of these zones. There is, however, a greater pressure existing in the space underneath the flange 19 connected to the steam space above the normal level as compared to the pressure existing in the zone between the two bellows and connected to the water space of the boiler drum below the normal water level. The difference in pressure, of course, is equal to the head of water between the low water level connection, namely, the point where line 3 connects into the boiler drum and the casing 2. This difference, of course, is due to the fact that the line 3 is filled with water, this head acting against the normal boiler pressure and diminishing by the amount of this head, the pressure existing in the space between the bellows 20 and 24.

With this condition of affairs then and with the water at normal level, a greater pressure will exist underneath flange 19 than exists on top of it and the valve will be held to its closed position as shown in Figure 2. Rod 15 attached to spring 18 is so adjusted externally of the housing 2 as to produce just this result in view of the differential head existing on opposite sides of the flange 19.

As concerns bellows 24 it is obvious that the steam pressure, or pressure exerted by the steam, considered alone is equal on both sides of this bellows, there being, therefore, no differential of pressure between the inside and outside of bellows 24 produced by the steam pressure alone.

If we suppose now that the water level in steam drum 1 is lowered sufficiently to uncover the pipe connection 3 the water filling this pipe line will run out of the same into boiler drum 1 and steam will pass up this line with the result that the same pressure will exist on both sides of the flange member 19, that is, the pressure underneath this flange member will balance the pressure in the zone between bellows 20 and 24 with the result that spring 18 will act downwardly to move the valve member 36 away from its seat 38 and thus admit steam to the alarm whistle 10 to sound the same.

Upon restoration of normal water level, pipe 3 will again fill with water, as hereinbefore described, so as to decrease the pressure above flange 19 and the valve will be forced to its seat by virtue of the differential pressure existing on the top and bottom of this flange member 19 and hereinbefore described.

Conversely, should the water level rise, so as to submerge the opening to line 5 this will fill with water, with the result that again the same pressure will exist on each side of the flange member 19. The result will be that at high water level the spring 18 will again act to pull the valve member 36 downwardly away from its seat 38 and thus admit steam to the whistle to sound the alarm.

At the normal water level, then, a pressure differential obtains on the two sides of the flange member 19, this pressure being greater on the under side of the flange and acting against the force of spring 18 to hold the valve closed. If the water level falls, the pressure is equalized on the two sides of the flange member 19, or, in other words, the pressure on the top side of this flange 19 increases until it equals the pressure existing on the under side of the flange member 19, with the result that the spring 18 acts to operate the valve to sound the alarm. At high water level, the pressure underneath the flange 19 drops until it equals the pressure inside the bellows 29 on top of flange 19 with the result that spring 18 again acts to open the valve to sound the alarm.

When the alarm mechanism is actuated at either high or low water, the bellows system is in complete equilibrium as regards pressure and the spring 18 furnishes the necessary force to actuate the valve to supply steam to the alarm whistle to sound the same.

It is obvious that the parts of the device subjected to full boiler pressure may be made of any suitable proportions to withstand that pressure. These parts are the housing 2 with the associated flanges 28 and 29, tube 34, coupling 9 and plug 39. Inasmuch as the only pressure differential that is ever impressed on the bellows is simply that due to the head of water in the connecting lines, it is obvious that the steam pressure of the boiler, to which this device is connected, may be very high without affecting the satisfactory operation of the device. The mechanism may, therefore, be applied to ranges of pressure greatly in excess of that possibly applicable in the use of the conventional high and low alarm mechanism.

The force operating the whistle valve is, of course, applied by the spring 18 which is kept in regulable tension as hereinbefore described. When this spring is acting to open the whistle valve, the bellows are in completely balanced condition as regards pressure. This permits the application of force directly to the whistle valve without the use of intermediate pivoted members, such as levers, with, of course, the avoidance of all friction losses inherent in such a system. There is, it is true, a small but constant force required to deflect bellows 20 and 24 but this may be made very small in amount due to the fact that the differential pressure to which any of these bellows members is subjected is, in all events, quite small. The device, therefore, affords a much simpler and more powerful means of operating the whistle valve than is had, for example, in the conventional high and low alarm mechanism employing either the weights or float displacement principle. It is applicable over a much wider pressure range and, in fact, considerably extends the possible field of usefulness of an apparatus of this general type.

The spring 18 being externally adjustable, it is possible to regulate the force applied for operating the whistle valve while the boiler is in service, this being an additional feature not found in the conventional high and low alarm mechanism.

The force acting against spring 18 to keep the valve closed at the normal water level is obviously a product of two factors. One of these is the pressure differential existing on both sides of the flange 19. This pressure differential is obviously multiplied by an area factor, namely, the area of flange 19 to produce the force acting counter to spring 18 to maintain the valve in the closed position. In cases where the differential head must be kept relatively small compensation for this factor may be obviously had by increasing the area of the flange member 19. It is obvious, therefore, that a high degree of flexibility in the design is thus afforded which, together with the adjustable features of spring 18, permits a wide and ready variation in the forces applied to actuate the whistle valve.

While I have shown and described one particularly preferred embodiment of my invention it is understood that the same may be varied without departing from the spirit of my invention and I wish to be limited only as set forth in the appended claims.

What I claim is:

1. In a device for indicating variations from a normal desired level of a liquid in a container, a housing, means dividing the interior of the housing into a plurality of separate zones, one of said zones being maintained at a higher pressure than another of said zones when the liquid is at said normal desired level, means normally establishing communication between one of said zones and the vapor space of the container, means normally establishing communication between another of said zones and the liquid space of the container, an alarm, and means within the housing operable upon any variation from normal in the communication between either zone and its respective space in the container to actuate said alarm.

2. In a device for indicating variations from a normal desired level of water in a boiler drum, a housing, pressure responsive means dividing said housing into two chambers, means establishing communication between one of the chambers in said housing and the normal steam space of the drum, separate means establishing communication between the other chamber in said housing and the normal water space of the drum, a coupling mounting an alarm device and connected to said housing but spaced therefrom, means establishing communication between said coupling and the steam space of the drum, and means to retard the flow of steam from said coupling into said housing.

3. In a high and low water alarm mechanism, a housing, a pressure responsive member in said housing dividing the same into two chambers, a conduit connecting one of said chambers to the normal steam space of a boiler drum so arranged that one side of said pressure responsive member is subjected solely to the pressure of the steam in said boiler drum, a spring connected to one side of said pressure responsive member acting to restrain movement thereof by the pressure of the steam in the boiler drum, a second conduit connecting the other of said chambers to the normal water space of the boiler drum, said second conduit being inclined downwardly from said housing to the boiler drum whereby the said second chamber is normally maintained at a pressure less than the pressure of the steam in the boiler drum, a whistle, a valve controlling the supply of fluid to said whistle, and a stem connecting said valve to the other side of said pressure responsive member whereby said valve is actuated upon a predetermined movement of said pressure responsive member.

4. In a device of the character described, an alarm, a housing, a movable pressure actuated member dividing said housing into two chambers, said pressure actuated member being adapted to control the actuation of said alarm and being adapted when opposite sides thereof are subjected to different pressures to prevent the actuation of the alarm, connections between the chambers in said housing and a boiler drum so arranged that when the level of the water in said boiler drum is between predetermined high and low limits the pressure in one of said chambers exceeds the pressure in the other chamber while when the level of the water in the boiler drum reaches either said predetermined high or low limits both chambers are subjected to substantially the same pressure, a spring in said housing arranged to actuate said alarm when the pressures in both of said chambers are substantially equal, and means disposed exteriorly of said housing for adjusting the tension on said spring.

5. In a device of the character described, a housing, a movable pressure actuated member dividing the interior of said housing into two chambers, connections between said chambers and a boiler drum so arranged that when the level of the water in the boiler drum is between predetermined high and low limits the pressure in one chamber exceeds the pressure in the other chamber, whereas when the level of the water in the boiler drum reaches either of said predetermined high or low limits the chambers are subjected to substantially equal pressures, an alarm, a valve controlling the actuation of said alarm, a connection between said valve and the pressure actuated member for controlling the actuation of the valve from the pressure actuated member, the arrangement being such that when the pressure in one chamber exceeds the pressure in the other chamber the pressure actuated member prevents the opening of the valve, and a spring within said housing arranged to move the pressure actuated member to open the valve when the pressures in the said chambers are substantially equal.

6. In a device for indicating variations from a normal desired level of water in a boiler drum, a housing, a flexible bellows disposed in said housing and having its one end fixed against movement therein, a plate secured to and closing the other end of said bellows, said plate and bellows dividing the housing into two chambers, means establishing communication between one of said chambers and the vapor space of the boiler, means establishing communication between the other of said chambers and the liquid space of the boiler, the arrangement being such that when communication is established between either of said chambers and the space in the boiler with which said chambers are not normally in communication opposite sides of said plate will be subjected to substantially equal pressures, means for moving said plate when opposite sides thereof are subjected to substantially equal pressures, an alarm, and means connected to said plate for actuating said alarm.

7. In a device for indicating variations from a normal desired level of water in a boiler drum, a housing, a flexible bellows disposed in said housing and having its one end fixed against movement therein, a plate secured to and closing the other end of said bellows, said plate and bellows dividing the housing into two chambers, means establishing communication between one of said chambers and the vapor space of the boiler, means establishing communication between the other of said chambers and the liquid space of the boiler, the arrangement being such that when communication is established between either of said chambers and the space in the boiler with which said chambers are not normally in communication opposite sides of said plate will be subjected to substantially equal pressures, means for moving said plate when opposite sides thereof are subjected to substantially equal pressures, an alarm, a rod connected to said plate and extending through one of said chambers for actuating said alarm, and a flexible bellows secured to said rod and sealing an opening in the chamber through which said rod passes.

8. In a device for indicating variations from a normal desired level of water in a boiler drum, a housing, an annular member fixed in one end of said housing, a flexible bellows having its one end fixed to said annular member, a plate secured to the other end of said bellows, said plate and bellows dividing the housing into two chambers, means establishing communication between one of said chambers and the vapor space of the boiler, means establishing communication between the other of said chambers and the liquid space of the boiler, the arrangement being such that when communication is established between either of said chambers and the space in the boiler with which said chambers are not normally in communication opposite sides of said plate will be subjected to substantially equal pressures, an alarm, a rod secured to said plate and passing through one of said chambers and through an opening formed in said annular member for actuating said alarm, a flexible bellows secured to said rod and to the annular member adjacent the opening in the latter, and means for moving said plate when opposite sides thereof are subjected to substantially equal pressures.

CURTIS L. HOWSE.